(12) United States Patent
Kaupert

(10) Patent No.: US 8,261,863 B2
(45) Date of Patent: Sep. 11, 2012

(54) OPERATING PROCESS FOR A FUEL CELL SYSTEM

(75) Inventor: Andreas Kaupert, Esslingen (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 356 days.

(21) Appl. No.: 12/640,431

(22) Filed: Dec. 17, 2009

(65) Prior Publication Data

US 2010/0155163 A1    Jun. 24, 2010

(30) Foreign Application Priority Data

Dec. 24, 2008  (DE) .......................... 10 2008 063 088

(51) Int. Cl.
*B60W 10/28* (2006.01)
(52) U.S. Cl. ..................... 180/65.275; 903/944; 701/22; 429/429
(58) Field of Classification Search ............... 180/65.21, 180/65.275, 65.31; 903/908, 944, 644; 701/1, 701/22; 429/400, 428, 429
See application file for complete search history.

(56) References Cited

U.S. PATENT DOCUMENTS

| | | | |
|---|---|---|---|
| 5,828,967 A | 10/1998 | Ueda | |
| 7,273,120 B2 * | 9/2007 | Tabata | ..................... 180/65.265 |
| 7,438,984 B2 * | 10/2008 | Aoyagi et al. | ................ 429/430 |

FOREIGN PATENT DOCUMENTS

DE           695 11 675           12/1999

\* cited by examiner

*Primary Examiner* — John Walters
(74) *Attorney, Agent, or Firm* — McGlew and Tuttle, P.C.

(57) ABSTRACT

A process for operating a fuel cell system (2) arranged in a vehicle (1), in which process a foreseeable travel time duration and/or a foreseeable travel time end point are communicated to a control device (4) of the fuel cell system (2) at the beginning of a travel of the vehicle (1) or during the travel. The control device (4) operates the fuel cell system (2) such that a switch-off procedure for switching off the fuel cell system (2) is started so far ahead of the foreseeable end of the travel in time that the switch-off procedure will have been completed extensively simultaneously with the foreseeable end of the travel and the fuel cell system (2) is switched off.

20 Claims, 1 Drawing Sheet

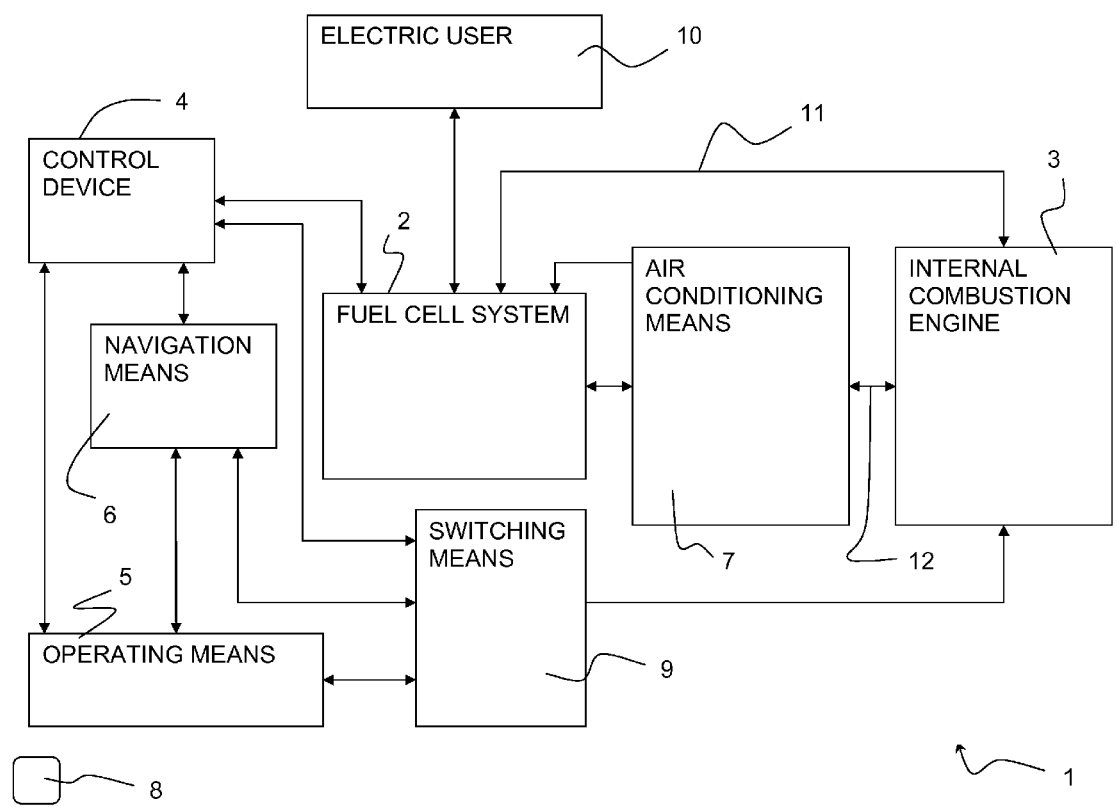

OPERATING PROCESS FOR A FUEL CELL SYSTEM

CROSS REFERENCE TO RELATED APPLICATIONS

This application claims the benefit of priority under 35 U.S.C. §119 of German Patent Application DE 10 2008 063 088.8 filed Dec. 24, 2008, the entire contents of which are incorporated herein by reference.

FIELD OF THE INVENTION

The present invention pertains to a process for operating a fuel cell system arranged in a vehicle. In addition, the present invention pertains to a motor vehicle with a fuel cell system.

BACKGROUND OF THE INVENTION

A fuel cell system, which generates electric current from an anode gas and a cathode gas in the usual manner, may reach comparatively high temperatures during operation, especially if the fuel cell used in it is an SOFC fuel cell. To switch off the fuel cell system, it is usually necessary to carry out a predetermined switch-off procedure or switch-off routine in order to switch off the fuel cell system in such a way that this is as gentle for its components as possible. Furthermore, it must be ensured that no critical gas mixture concentrations will build up and that no unacceptably high pollutant emissions will take place. In particular, an attempt is made by a specific switch-off procedure to avoid soot formation within the fuel cell system. This leads to reduced pollutant emissions, reduced fuel consumption, longer service life for the fuel cell system and increased efficiency for the fuel cell system. Furthermore, operating a fuel cell is not permitted in certain environments of the vehicle, for example, in closed spaces, for example, garages and closed parking garages or at a gas station.

In addition, it may also be necessary for switching on such a fuel cell system to perform a predetermined switch-on procedure or switch-on routine in order to switch on the fuel cell system or to run up the power of the fuel cell system in such a way that it is as gentle for its components as possible. For example, it must also be ensured when running up the power that no critical gas mixture concentrations will build up and no unacceptably high pollutant emissions will take place.

SUMMARY OF THE INVENTION

The present invention pertains to the object of providing an improved embodiment for a process for operating a fuel cell system, which is located in a motor vehicle, which is characterized especially in that proper switching off and switching on of the fuel cell system is facilitated.

According to the invention a vehicle full system process and a motor vehicle comprising a fuel cell system are provided. A control device is provided for operating the fuel cell system. A foreseeable travel time duration and/or a foreseeable travel time end point are communicated to the control device of the fuel cell system at the beginning of a travel of the vehicle or during the travel. The control device activates a switch-off procedure for switching off the fuel cell system or a switch-on procedure for switching on the fuel cell system based on a foreseeable end of travel in time such that the procedure will have been completed extensively simultaneously with the foreseeable end of travel and the fuel cell system is switched off or switched on or brought into a standby mode.

The present invention is based on the general idea of communicating the foreseeable travel time duration and/or the foreseeable travel time end point for a travel of the vehicle to the fuel cell system or to a control device of the fuel cell system. The control can then operate the fuel cell system in a specific manner such that a switch-off procedure is performed in time according to a first solution such that this is terminated when the expected end of the travel is reached in a timely manner before or after or simultaneously. When the end of travel is reached, the fuel cell system is thus essentially switched off in the case of the procedure being proposed. This leads to a resource-sparing operation of the fuel cell system. Furthermore, it is also possible to embody switch-off procedures lasting longer in time, which make it possible to switch off the individual components of the fuel cell system in an especially gentle manner. For example, the fuel cell system may be brought step by step from a full-load operation to a no-load operation via a plurality of stepped partial load operations in order to switch it subsequently off. As a result, sufficient time is, in particular, available for the switch-off procedure to avoid soot formation within the fuel cell system or pollutant emissions or fire hazards when switching off the vehicle.

Corresponding to a second solution, the control can operate the fuel cell system in a specific manner such that a switch-on procedure is carried out in time such that this is terminated when the expected end of travel is reached in a timely manner before or after or simultaneously. When the end of travel is reached, the fuel cell system is thus essentially switched on or its power is run up in the procedure being proposed. This also leads to resource-sparing operation for the fuel cell system. It is also possible to perform longer-lasting switch-on procedures, which make it possible to switch on the individual components of the fuel cell system especially gently. For example, it is also possible here to bring the fuel cell system step-by-step from a no-load operation into full-load operation via a plurality of stepped partial load operations.

Furthermore, it is possible in both alternative solutions to design the switch-on procedure and the switch-off procedure such that the fuel cell system assumes a standby mode when the expected end of travel is reached. Such a standby mode is characterized in that the fuel cell system can generate precisely as much electric current that even though all electric users of the system can be sufficiently supplied with current, release of current to external power users is not possible or is possible to a greatly limited manner only. The power of the fuel cell system can be run up easily and rapidly from this standby mode into a full-load operation, on the one hand, and the power can be reduced to switching off, on the other hand. The fact that the fuel cell system is brought to the standby mode at the end of travel makes it possible for a corresponding control, in particular, to start a polling when the internal combustion engine is switched off, which polling enables the driver of the vehicle to decide to subsequently reduce or increase the power of the fuel cell system or to continue to operate it in the standby mode.

The foreseeable travel time duration or the foreseeable travel time end point can be entered into the particular control device, for example, manually by the driver of the vehicle. The fuel cell system can be equipped with a corresponding operating means for this. An operating device of the vehicle may, in principle, also be used for this if this is adapted, especially programmed for this and communicates with the control device of the fuel cell system.

In addition or as an alternative, provisions may be made according to an especially advantageous embodiment to couple the control device of the fuel cell system with a navigation means of the vehicle. After the destination has been set by the driver of the vehicle, the navigation means can automatically calculate the foreseeable travel time duration or the foreseeable travel time end point. These data can then be communicated by the navigation means to the control device of the fuel cell system quasi automatically, so that the fuel cell system can ensure the switching off or switching on of the fuel cell system in time as a function of these data.

The control device may operate especially interactively, for example, in order to perform a polling when an internal combustion engine of the vehicle is switched off to determine whether the vehicle is in a safe environment, whether the fuel cell system should be switched off, whether the power of the fuel cell system can be raised or whether the fuel cell system can continue to be operated further in the standby mode.

The control may cooperate for this with a switching means, which controls the switching on and switching off of the internal combustion engine. It is usually an ignition lock, which cooperates for this with a corresponding ignition key or with an on-off switch of the internal combustion engine. As an alternative, the switching means may also cooperate with wireless actuating elements, e.g., a remote control or a mobile phone or a so-called Keyless Go card.

Corresponding to another advantageous embodiment, the control device can determine a foreseeable operating time available for the operation of the fuel cell system or operating time on the basis of the foreseeable travel time duration or on the basis of the foreseeable travel time end point. Depending on this foreseeable operating time, the control device can now select a mode of operation that is especially suitable for the available foreseeable operating time from among different available modes of operation with which the fuel cell system can be operated, in order to operate the fuel cell system according to that mode of operation. For example, it is possible to make a selection in a simple case between a short-term operation and a long-term operation, which permits, for example, different loads of the fuel cell system. For example, the long-term operation may be meaningful in terms of energy management in case of a comparatively long minimum operating time only. The foreseeable operating time may also be so short that it makes no sense in terms of energy management to activate the fuel cell system. By taking into account the foreseeable operating time, the fuel cell system can thus be operated with increased efficiency in terms of energy.

An estimated minimum travel time, which can be estimated, for example, in connection with and by means of a navigation means, may also be used as the basis for the selection of different modes of operation corresponding to another embodiment. For example, the navigation means can recognize, even when it is not being used for navigation, whether the vehicle is located on an expressway (turnpike) outside a built-up area or within a built-up area. If the vehicle is within a built-up area, a relatively short travel time can be assumed with increased probability. However, a longer minimum travel time may be assumed with an increased probability in case of turnpike travel. In particular, these estimations may also be combined with a manual entry of the minimum travel time by the driver of the vehicle.

It is apparent that the features mentioned above, which will still be explained below, are applicable not only in the particular combination shown but also in other combinations or alone without going beyond the scope of the present invention.

Preferred embodiments of the present invention are shown in the drawings and will be explained in more detail in the following description. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:
The only FIG. 1 shows a greatly simplified, circuit diagram-like general view of a motor vehicle with a fuel cell system.

DESCRIPTION OF THE PREFERRED EMBODIMENTS

Referring to the drawings in particular, corresponding to FIG. 1, a motor vehicle 1, shown in a simplified manner, comprises a fuel cell system 2. The fuel cell system 2 is used in the vehicle 1 as a supply source of electric energy. The fuel cell system 2 can supply electric current independently from an internal combustion engine 3 of the vehicle, i.e., especially also with the internal combustion engine 3 switched off. It is used to supply at least one electric user 10 of the vehicle 1 with electric energy.

A control device 4, which is coupled with the fuel cell system 2 in a suitable manner, is provided for operating the fuel cell system 2. The fuel cell system 2 is switched on during a travel of the vehicle 1 in case of a corresponding current demand. The control device 4 knows the foreseeable travel time duration and/or the foreseeable travel time end point. These data are communicated to the control device 4 in a suitable manner. For example, a vehicle driver can enter said data manually into an operating means 5, which communicates with the control device 4 in a suitable manner. It is, for example, an operating means 5 that is contained in the vehicle specifically for operating the fuel cell system 2. As an alternative, the operating means 5 may also be an operating means of the vehicle 1, which is adapted to receive corresponding data and commands for the control device 4 of the fuel cell system 2.

In addition or as an alternative, the foreseeable travel time duration or the foreseeable travel time end point can be communicated to the control device 4 via a navigation means 6. For example, the vehicle driver may enter a destination via the operating means 5 or via another operating means. The navigation means 6 will then automatically calculate the foreseeable travel time duration or the foreseeable travel time end point and can communicate these data to the control device 4 either directly or indirectly via the operating means 5. This communication of the duration of travel time or of the travel time end point may take place at the beginning of the particular travel or also during the travel.

The fuel cell system 2 is coupled in the example with the internal combustion engine 3 in a heat-transmitting manner corresponding to a double arrow 11. In addition, the internal combustion engine 3 may be coupled with an air conditioning means 7 in a heat-transmitting manner corresponding to a double arrow 12. In addition or as an alternative, a heat-transmitting coupling may also be provided between the fuel cell system 2 and the air conditioning means 7 according to a double arrow 13.

The control device 4 is designed now such that it activates a switch-off procedure, with which the fuel cell system 2 can be switched off "gently," in time with respect to the foreseeable end of the travel. The gentle switching off involves, for example, a minimal thermal load on the components and/or minimal pollutant emission and/or optimal efficiency. The start of the switch-off procedure is set by the control device 4 in a specific manner such that the switch-off procedure will have been fully completed at a point in time at which the end of travel is expected. The fuel cell system 2 is switched off after the end of the switch-off procedure. When the expected end of travel is reached, the fuel cell system 2 is thus switched off. The switch-off procedure may optionally be placed in time somewhat earlier, so that it is fully terminated in a timely manner, but before the foreseeable end of travel. A slight time delay is also tolerable. In particular, the switch-off procedure is set in time by the control device 4 such that the last third or last fourth of the switch-off procedure falls in time within a period in which the foreseeable end of the travel occurs.

As an alternative, the control device 4 may also control the switch-off procedure in a specific manner such that the fuel cell system 2 will have reached the standby mode when the foreseeable end of travel is reached. The control means 4 may operate interactively in this case, e.g., via the operating means 5, for example, in order to receive the release for the repeated increase in the power of the fuel cell system 2 from the vehicle driver or in order to continue to operate the fuel cell system 2 in the standby mode or completely or in order to completely reduce the power of the fuel cell system 2, for example, if the vehicle is in an environment in which operation of the fuel cell system is not permissible.

In addition or as an alternative, the control device 4 may also be designed such that it activates a switch-on procedure, with which the fuel cell system 2 can be switched on "gently," in time with respect to the foreseeable end of travel. Just as before in case of the gently switching off, gentle switching on likewise involves a minimal thermal load on the components and/or minimal pollutant emission and/or an optimal efficiency. The start of the switch-on procedure is specifically set by the control device 4 in time such that the switch-on procedure will have taken place completely by a point in time at which the end of travel is expected. At the end of the switch-on procedure, the fuel cell system 2 is switched on, which coincides with the expected end of travel. An optional shifting of the switch-on procedure is conceivable in this case as well, so that this will have concluded in a timely manner, but before the foreseeable end of travel. A slight time delay is tolerable here as well.

Furthermore, provision may optionally be made here as well for the power of the fuel cell system 2 not to be raised fully but only up to the standby mode in order to decide then again by interaction with the user whether the power of the fuel cell system should be increased fully, whether the fuel cell system should remain in the standby mode or perhaps the power should even be reduced.

The different variants mentioned above can be embodied with the same control device 4. The control device 4 makes it possible via the operating means 5 to correspondingly select different procedures. Any desired and meaningful combinations of the different possibilities are conceivable, in principle, as well.

Based on the foreseeable duration of travel or based on the foreseeable travel time end point, the control device 4 can determine a foreseeable operating time, which is available for the operation of the fuel cell system 2. The control device 4 is advantageously designed in this case such that as a function of this determined foreseeable operating time, it selects a mode of operation suitable for the currently available operating time from among a plurality of preset, different modes of operation, with which the fuel cell system 2 can be operated. The control device 4 will now operate the fuel cell system 2 on the basis of this selected mode of operation.

If a navigation means 6 is present, the control device 4 can automatically estimate a foreseeable minimum travel time in the knowledge of the current location data of the vehicle 1. This minimum travel time will then correspond to the available operating time for operating the fuel cell system 2. The control device 4 can thus again select the mode of operation that is best suited for the available minimum travel time based on location data of the navigation means 6 or as a function of the foreseeable minimum travel time determined.

Furthermore, the control device 4 may also recognize an unscheduled interim stop or a travel interruption, which may occur, for example, because of a breakdown or because of traffic congestion. For example, coupling with a dynamic navigation means 6, which can process traffic messages, is conceivable. As a result, the operating characteristics of the fuel cell system 2 can be automatically adapted, for example, if the foreseeable end of the travel time is shifted. The control 4 can also recognize via the navigation means 6, for example, when the vehicle 1 leaves a planned route, so that, e.g., the probability of an unscheduled stop increases. Furthermore, coupling with a tank filling level measuring means is conceivable. If the control 4 recognizes that the vehicle 1 leaves the planned route in case of a low fuel level, the control device 4 can assume a stop for filling up with a high probability and prepare the fuel cell system 2 for switching off, because, for example, operation of the fuel cell system 2 may be prohibited in the area of a gas station.

The navigation means 6, which may especially be a satellite-supported navigation means, a so-called GPS system, can recognize, for example, whether the vehicle 1 is on a turnpike or on an interurban road or outside a city or within a city. The control device 4 can correspondingly estimate in the knowledge of these location data whether a longer or a shorter minimum travel time can be expected. If the vehicle 1 is moving within a city, a shorter minimum travel time is estimated than when the vehicle is being operated outside a city. The navigation means 6 does not have to be activated for navigation for providing these location data. The navigation means 6 may rather determine and provide location data of the vehicle 1 permanently.

Unexpected delays in travel, which can be identified by the control 4, especially in conjunction with the navigation means 6, may occur even in case of the above-mentioned embodiment. The control device 4 will now make possible corresponding responses to the changing boundary conditions.

Modes of operation that can be selected as a function of the available operating time or the estimated minimum travel time can be distinguished from one another by at least one of the following criteria or by any desired combination thereof. The particular mode of operation may allow, for example, regeneration cycles for at least one of the components of the fuel cell system 2. For example, it may be necessary from time to time to regenerate a reformer, for example, in order to burn off soot deposits. Relatively high temperatures are necessary for this. Such a regeneration cycle makes sense only if sufficient time is available to reach these high regeneration temperatures and to gently decrease these temperatures again after the regeneration. Another mode of operation may be characterized in that it permits a maximum load of the fuel cell system 2, for example, in terms of current delivery and/or the temperature of at least one component of the fuel cell system 2. Such a mode of operation is considered for longer travel times. Modes of operation that permit only low or medium loads of the fuel cell system can be considered for shorter and medium travel times.

Corresponding to another advantageous embodiment, provisions may be made for the control device 4 to prompt the driver of the vehicle 1 via the operating means 5 in case of an interim stop to continue to permit, i.e., release the present normal operation of the fuel cell system 2, or to start the switch-off procedure or a shortened switch-off procedure. Via the operating means 5, the control device 4 can likewise permit the selection of bringing the fuel cell system 2 into the standby mode or to continue to operate it in said standby mode. The particular polling may be triggered, for example, by the actuation of a switching means 9. This is an ignition lock of the vehicle 1 in the simplest case. The switching means 9 is thus connected to the internal combustion engine 3 or to a corresponding engine control device in every case. In addition, the switching means 9 is connected here to the control device 4, to the operating means 5 and here also to the navigation means 6. The switching off of the internal combustion engine 3 may trigger the polling of the control device 4 in order to set the further operation for the fuel cell system 2 depending of the operating state of the fuel cell system 2. In particular, the aforementioned decision possibilities are offered to continue the operation of the fuel cell system 2 in the standby mode, to completely reduce the power of the fuel cell system or to increase its power to full load. An interim stop is present if the internal combustion engine 3 of the vehicle 1 is switched off in terms of time before the foreseeable end of travel. The control device 4 could not yet switch off the fuel cell system 2 by this point in time. Furthermore, the control device 4 assumes at such a point in time that travel can be continued shortly, so that the originally communicated data on the travel time duration and the end of the travel time are, in principle, still valid. Depending on the environment of the vehicle 1 during this interim stop, the driver of the vehicle must decide whether or not it is necessary to switch off the fuel cell system 2. It may be required in case of a stop for filling up to switch off the fuel cell system 2 as quickly as possible. In particular, at least two different switch-off procedures may be available for switching off the fuel cell system 2 manually, namely, the usual, gentle and time-consuming switch-off procedure, on the one hand, which the control device 4 activates automatically depending on the foreseeable travel time duration or the foreseeable travel time end point. In addition, a shortened switch-off procedure may be provided, by means of which the fuel cell system 2 can be switched off comparatively quickly, for example, when the fuel cell system 2 is temporarily switched off during a stop for filling up the vehicle with fuel. A fast, temporary switching off can be achieved, e.g., by interrupting the supply of media. Coupling with the switching means 9 is again also conceivable here, in principle. For example, the polling on whether the fuel cell system 2 may be allowed to continue to be operated in the current mode of operation or whether it must be switched off is again triggered by pulling the ignition key. If no entry is made by the driver of the vehicle, provisions may be made for the control device 4 to automatically cause fast switching off of the fuel cell system 2 after the end of a predetermined waiting time. An operating error can be prevented and the reliability of operation can be increased hereby.

It is clear that updating of the travel time duration or of the travel time end point or of the foreseeable minimum travel time or operating time can be performed permanently or periodically during travel of the vehicle 1. In particular, such an updating can be carried out automatically, either permanently or periodically, via the navigation means 6.

The vehicle 1 may contain an air conditioning means 7, by means of which an interior space of the vehicle or passenger compartment, not shown in more detail, can be air conditioned. The air conditioning means 7 is thus used to heat and cool said interior space of the vehicle. The fuel cell system 2 may now be coupled with this air conditioning means 7 in order to make it possible to operate the air conditioning means 7 independently from the operation of the internal combustion engine 3.

Via the operating means 5, the vehicle driver 1 can communicate a foreseeable start of the travel time as well as a desired interior space temperature either manually or via a remote control 8. As a function of the desired interior space temperature (temperature set point) and in the knowledge of the current interior space temperature (actual temperature), the control device 4 can determine a heating demand or a cooling demand that is necessary to set the desired temperature set point in the interior space of the vehicle. Depending on the heating demand or cooling demand determined, the control device 4 can determine an operating time that is necessary for this for the air conditioning means 7. The determination of the heating demand or cooling demand as well as the determination of the corresponding operating time can be performed by means of characteristic diagrams and the like.

As a function of the operating time determined, which the air conditioning means 7 needs to set the desired temperature set point in the interior space of the vehicle, the control device 4 can determine a point in time at which switching on of the fuel cell system 2 is to be started. This start time takes into account a duration that is necessary for a starting procedure for switching on the fuel cell system 2 and to increase its power. The start time of the fuel cell system 2 is set such that sufficient time is available for the air conditioning means 7 to set the desired temperature in the interior space. The driver can then use the comfort of the heated or cooled interior space at the beginning of travel.

Specifically increasing the power of the fuel cell system 2 at the end of travel may be advantageous, for example, if the vehicle 1 will be switched off after a long travel to maintain a specified break and if electric users shall be operated independently from the internal combustion engine 3 during this break. For example, a plurality of electric users, which require a relatively large amount of electric power, may be present in a cab of a vehicle 1. For example, operation of an air conditioning unit, an electric heating means as well as a television set is conceivable. In general, an electric energy supply operating independently from the internal combustion engine 3 by the fuel cell system 2 may be desirable whenever the interior space of the vehicle is utilized as a workplace. It is always presumed here that the vehicle 1 is in a safe environment that is suitable and permissible for the operation of the fuel cell system 2.

While specific embodiments of the invention have been described in detail to illustrate the application of the principles of the invention, it will be understood that the invention may be embodied otherwise without departing from such principles.

What is claimed is:
1. A process for operating a fuel cell system arranged in a vehicle, the process comprising:
communicating one or more of a foreseeable travel time duration and a foreseeable travel time end point to a control device of the fuel cell system at the beginning of a travel of the vehicle or during the travel;

operating the fuel cell system with the control device such that at least one of:
- a switch-off procedure for switching off the fuel cell system is started in time, before the foreseeable end of travel, such that the switch-off procedure will have taken place completely extensively simultaneously with the foreseeable end of travel and the fuel cell system is switched off or brought into a standby mode; and
- a switch-on procedure for switching on the fuel cell system is started in time, before the foreseeable end of travel, such that the switch-on procedure will have taken place completely extensively simultaneously with the foreseeable end of travel and the fuel cell system is switched on or brought into a standby mode.

2. A process in accordance with claim 1, wherein the one or more of the foreseeable travel time duration and the foreseeable travel time end point are entered by a driver of the vehicle manually into an operating means of the fuel cell system or of the vehicle, said operating means communicating with the control device for operating the fuel cell system.

3. A process in accordance with claim 1, wherein when an internal combustion engine of the vehicle is switched off, a polling is performed, controlled by a switching means, said polling enabling the driver of the vehicle to make a selection between switching off the fuel cell system, increasing the power of the fuel cell system and standby mode of the fuel cell system.

4. A process in accordance with claim 1, wherein
the communicating includes communication between the control device of the fuel cell system or communication with an operating means of the fuel cell system and a navigation means of the vehicle, which said operating means communicates with the control device; and
the navigation means calculates the one or more of the foreseeable travel time duration and the foreseeable travel time end point after the destination has been entered by a vehicle driver and communicates the one or more of the foreseeable travel time duration and the foreseeable travel time end point to the control device of the fuel cell system indirectly or via the operating means or directly.

5. A process in accordance with claim 4, wherein said one or more of the foreseeable travel time duration, the foreseeable travel time end point, a calculated foreseeable minimum travel time and foreseeable operating time are permanently or periodically updated during the travel.

6. A process in accordance with claim 1, wherein
the control device determines a foreseeable operating time available for the operation of the fuel cell system on the basis of the one or more of the foreseeable travel time duration and the foreseeable travel time end point; and
the control device selects a suitable mode of operation from among different modes of operation for operating the fuel cell system and operates the fuel cell system in the selected mode of operation, depending on this foreseeable operating time.

7. A process in accordance with claim 6, wherein the different modes of operation differ from each other by at least one of the following criteria:
regeneration cycles for at least one component of the fuel cell system are permissible;
regeneration cycles for at least one component of the fuel cell system are not permissible;
a maximum load on the fuel cell system is permissible in terms of release of one or more of current and the temperature of at least one component of the fuel cell system;
only a medium load or only a low load of the fuel cell system is permissible in terms of the release of one or more of current and the temperature of at least one component of the fuel cell system.

8. A process in accordance with claim 1, wherein based on location data, which the control device of the fuel cell system receives from a navigation means of the vehicle, the control device of the fuel cell system automatically estimates a foreseeable minimum travel time and selects a suitable mode of operation from among different modes of operation for operating the fuel cell system as a function of the estimated foreseeable minimum travel time and operates the fuel cell system in that mode of operation.

9. A process in accordance with claim 8, wherein the control device estimates a longer minimum travel time if the location data of the vehicle show that the vehicle is one or more of on a turnpike, on an interurban road and outside a city, and estimates a shorter minimum travel time if the location data of the vehicle show that the vehicle is in a city.

10. A process in accordance with claim 1, wherein in case of an interim stop of the vehicle, during which an internal combustion engine of the vehicle is switched off before the foreseeable end of travel in terms of time, a vehicle driver is prompted via an operating means of the vehicle or of the fuel cell system, which said operating means communicates with the control device of the fuel cell system, to allow continued normal operation of the fuel cell system or to start a switch-off procedure for the fuel cell system and the electric users operated therewith.

11. A process in accordance with claim 1, further comprising: providing an air conditioning means, wherein:
the fuel cell system is used to operate the air conditioning means for at least one of heating and cooling a vehicle interior space independently from the operation of an internal combustion engine of the vehicle;
a foreseeable travel time end point and a desired interior room temperature are communicated to the control device;
the control device determines a heating demand or cooling demand as a function of the desired temperature of the interior space and determines, as a function thereof, an operating time, over which the air conditioning means must be operated in order to set the desired temperature of the interior space, and
depending on the determined operating time for the air conditioning means, the control device determines a start time for switching on the fuel cell system such that, taking into account a start-up procedure of the fuel cell system, sufficient time is available for setting the desired temperature of the interior space.

12. A process in accordance with claim 1, further comprising:
using the fuel cell system to preheat an internal combustion engine of the vehicle;
communicating a foreseeable starting point of the travel time to the control device;
depending on one or more of the actual ambient temperature and engine temperature, the control device determines a heating demand and, as a function thereof, the control device determines an operating time over which the fuel cell system must be operated in order to preheat the internal combustion engine; and depending on the operating time determined, the control device determines a start point for switching on the fuel cell system such that, taking into account the start-up procedure of the fuel cell system, sufficient time is available for reaching the desired preheating of the internal combustion engine.

13. A process in accordance with claim 1, wherein the fuel cell system is coupled with a cooling circuit of the internal combustion engine via a heat exchanger in a heat-transmitting manner, wherein the fuel cell system is used to heat the cooling agent circulating in the cooling circuit to use the waste heat of the fuel cell system to one or more preheat the internal combustion engine and to heat an interior space of the vehicle.

14. A motor vehicle comprising:
  a fuel cell system;
  a control device for operating the fuel cell system, one or more of a foreseeable travel time duration and a foreseeable travel time end point being communicated to the control device of the fuel cell system at the beginning of a travel of the vehicle or during the travel, the control device activating a switch-off procedure for switching off the fuel cell system or a switch-on procedure for switching on the fuel cell system based on a foreseeable end of travel in time such that the procedure will have been completed extensively simultaneously with the foreseeable end of travel and the fuel cell system is switched off or switched on or brought into a standby mode.

15. A motor vehicle in accordance with claim 14, further comprising an input and an operating means wherein the one or more of the foreseeable travel time duration and the foreseeable travel time end point are entered via the input by a driver of the vehicle manually into said operating means of the fuel cell system or of the vehicle, said operating means communicating with the control device for operating the fuel cell system.

16. A motor vehicle in accordance with claim 14, further comprising:
  a switching means; and
  an internal combustion engine, wherein the internal combustion engine of the vehicle is switched off, a polling is performed, controlled by said switching means, said polling enabling the driver of the vehicle to make a selection between switching off the fuel cell system, increasing the power of the fuel cell system and standby mode of the fuel cell system.

17. A motor vehicle in accordance with claim 14, further comprising a navigation system, wherein:
  communication between the control device of the fuel cell system or an operating means of the fuel cell system and said navigation means of the vehicle, which said operating means communicates with the control device; and
  the navigation means calculates the one or more of the foreseeable travel time duration and the foreseeable travel time end point after the destination has been entered by a vehicle driver and communicates the one or more of the foreseeable travel time duration and the foreseeable travel time end point to the control device of the fuel cell system indirectly or via the operating means or directly.

18. A motor vehicle in accordance with claim 14, wherein
  the control device determines a foreseeable operating time available for the operation of the fuel cell system on the basis of the one or more of the foreseeable travel time duration and the foreseeable travel time end point; and
  the control device selects a suitable mode of operation from among different modes of operation for operating the fuel cell system and operates the fuel cell system in the selected mode of operation, depending on this foreseeable operating time.

19. A motor vehicle in accordance with claim 18, wherein the different modes of operation differ from each other by at least one of the following criteria:
  regeneration cycles for at least one component of the fuel cell system are permissible;
  regeneration cycles for at least one component of the fuel cell system are not permissible;
  a maximum load on the fuel cell system is permissible in terms of release of one or more of current and the temperature of at least one component of the fuel cell system;
  only a medium load or only a low load of the fuel cell system is permissible in terms of the release of the one or more of current and the temperature of at least one component of the fuel cell system.

20. A motor vehicle in accordance with claim 14, wherein based on location data, which the control device of the fuel cell system receives from a navigation means of the vehicle, the control device of the fuel cell system automatically estimates a foreseeable minimum travel time and selects a suitable mode of operation from among different modes of operation for operating the fuel cell system as a function of the estimated foreseeable minimum travel time and operates the fuel cell system in that mode of operation.

* * * * *